US012547333B2

(12) United States Patent
Casad et al.

(10) Patent No.: US 12,547,333 B2
(45) Date of Patent: Feb. 10, 2026

(54) PREDICTIVE VTOC FAILURE ANALYSIS

(71) Applicant: International Business Machines Corporation, Armonk, NY (US)

(72) Inventors: Marc D Casad, Pleasanton, CA (US); Carrie J. da Silva, San Jose, CA (US); Michael Koester, Hollister, CA (US); Kevin L Miner, Lake City, FL (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 17/992,083

(22) Filed: Nov. 22, 2022

(65) Prior Publication Data

US 2024/0168667 A1  May 23, 2024

(51) Int. Cl.
*G06F 3/06* (2006.01)

(52) U.S. Cl.
CPC .......... *G06F 3/064* (2013.01); *G06F 3/0622* (2013.01); *G06F 3/0665* (2013.01); *G06F 3/067* (2013.01)

(58) Field of Classification Search
CPC ...... G06F 3/064; G06F 3/0622; G06F 3/0665; G06F 3/067
See application file for complete search history.

(56) References Cited

U.S. PATENT DOCUMENTS

| | | | |
|---|---|---|---|
| 5,644,696 A * | 7/1997 | Pearson | G06F 11/1469 |
| | | | 714/E11.122 |
| 7,305,393 B2 | 12/2007 | Seeger | |
| 7,624,127 B2 | 11/2009 | Smith | |
| 10,564,874 B2 | 2/2020 | Koester | |
| 2017/0220288 A1* | 8/2017 | Koester | G06F 3/0608 |
| 2020/0042631 A1* | 2/2020 | Ward | G06F 16/27 |

FOREIGN PATENT DOCUMENTS

JP  593661 A  1/1984

OTHER PUBLICATIONS

IBM, DFSMS Introduction, Aug. 12, 2013, Version 2 Release 1 https://publibz.boulder.ibm.com/epubs/pdf/dgt3di00.pdf (Year: 2013).*
IBM, Refreshing the VTOC and Index, updated on Mar. 22, 2021, Version 2.2.0, https://www.ibm.com/docs/en/zos/2.2.0?topic=version-refreshing-vtoc-index (Year: 2021).*
OA56084: IEC6081 DADSM Function Disabled the VTOC Index on DBCE,VOLSER,20DIAG=0820040B, Modified date Mar. 4, 2020, Version 230 https://www.ibm.com/support/pages/apar/OA56084 (Year: 2020).*
IBM, DFSMSDFP Advanced Services, 2015, Version 2 Release 2 chrome-extension://efaidnbmnnnibpcajpcglclefindmkaj/https://www.ibm.com/docs/en/SSLTBW_2.2.0/pdf/dgt3s310.pdf (Year: 2015).*
"Optimized VVDS and VTOC Allocation," IPCOM000178133D, IP.com, Jan. 16, 2009, 2 pages.
Anonymously, "VTOC Validation Tool," IPCOM000248126D, IP.com, Oct. 28, 2016, 3 pages.
"Information Disclosure Statement Transmittal Letter," signed by Joseph T. Van Leeuwen, Nov. 22, 2022, 1 page.

* cited by examiner

*Primary Examiner* — Kenneth M Lo
*Assistant Examiner* — Han V Doan
(74) *Attorney, Agent, or Firm* — Teddi E. Maranzano

(57) ABSTRACT

An approach is disclosed that identifies an anomaly in a Volume Table of Contents Index (VTOC Index) that is associated with a Direct Access Storage Device (DASD) Volume Table of Contents (VTOC) that corresponds to a DASD. The approach operates to automatically correct the VTOC Index based on the identified anomaly.

12 Claims, 6 Drawing Sheets

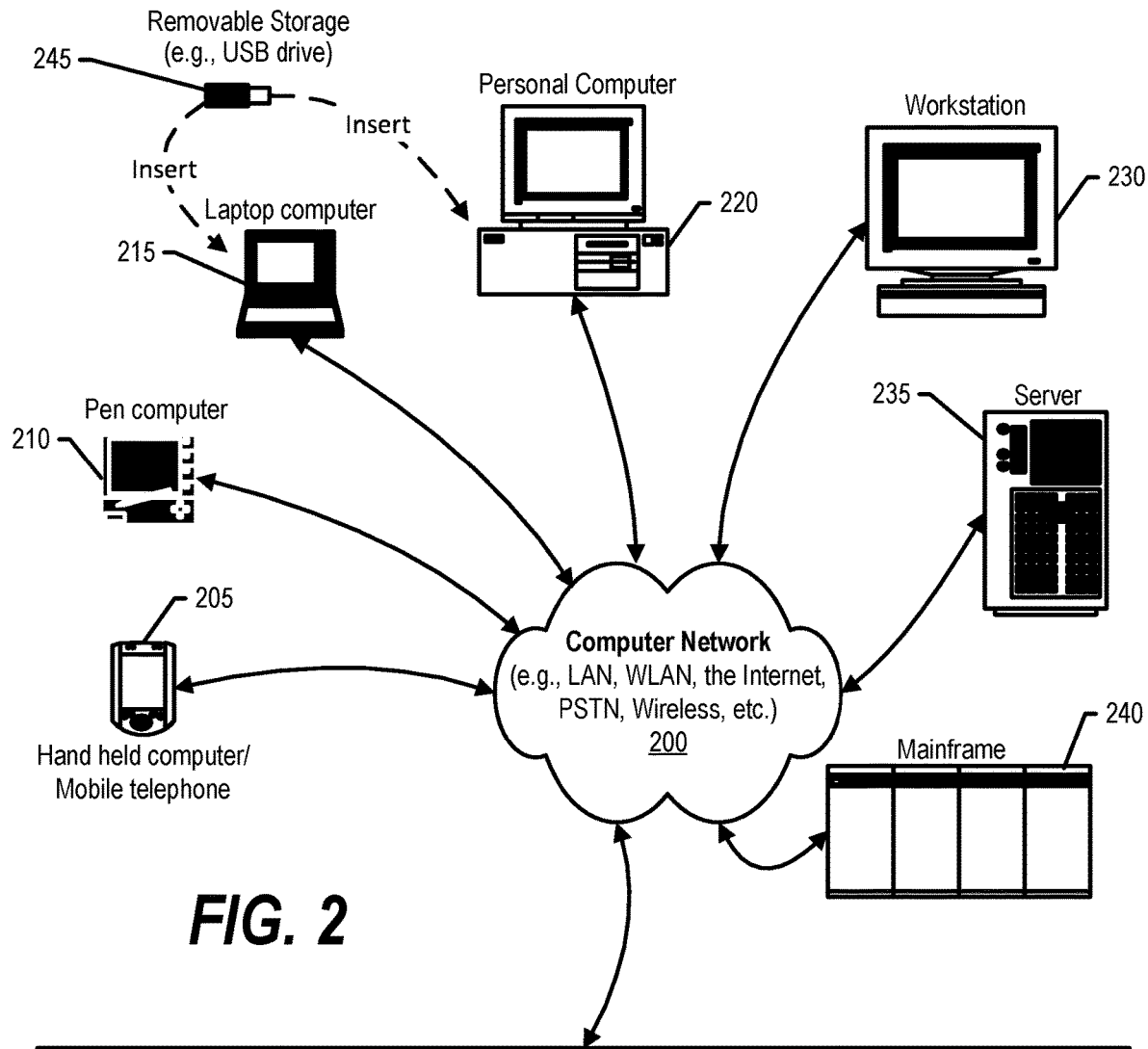
FIG. 2
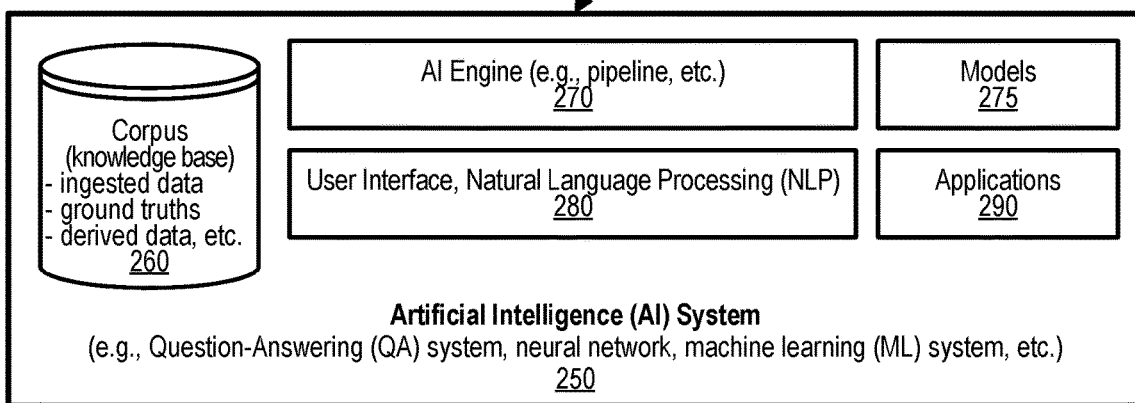

PREDICTIVE VTOC FAILURE ANALYSIS

BACKGROUND

Today computer operating system servers can store data in files on a hard drive, also known as, a Direct Access Storage Device (DASD) volume. A operating system server can have connectivity to one or tens of thousands of DASD volumes. A DASD volume can range in size from 1 GB to multiple TBs.

Over time, DASD storage technology has evolved to the point where DASD volumes can be clustered together into a specialized server known as a DASD storage system. A DASD storage system can vary in size and is user configurable as to the number and size of DASD volumes. Today's DASD storage systems can dynamically expand the size of a specific DASD volume. The care and management of these DASD storage systems is the responsibility of a DASD storage administrator.

Some operating systems, such as the z/OS™ operating system, manages data on these DASD volumes by means of data sets. The term data set refers to a file that contains one or more records. The record is the basic unit of information used by a program running on the operating system.

Each operating system DASD volume contains a Volume Table of Contents or VTOC. The VTOC records the size of the VTOC itself and the location, size and extents associated with each data set on the DASD volume. Additionally, the VTOC tracks the size of the DASD volume itself and the free space extents on the DASD volume. The VTOC also has flags to denote different type of error conditions that may occur.

Because a DASD volume can range in size of 1 GB to multiple TBs, the idea of a VTOC index was introduced. The VTOC index alphabetically groups the starting location of data sets on the DASD volume as well as the free space extents on a volume. The use of a VTOC index significantly improves locating, creating, and deleting data sets on a DASD volume. However, the use of a VTOC index is a decision left up to the storage administrator. The decision to use a VTOC index is directly influenced by the number of data sets expected to reside on the DASD volume. Anomalies can occur when using an indexed VTOC, and the operating system can disable the VTOC index and revert solely to the VTOC to locate, create and delete files. Performing these DASD tasks is considerably faster with a VTOC index instead of the VTOC itself.

Potential problems with the VTOC and Index VTOC can result in application outages, failures in transactional processing or performance degradation. Any of these impacts may result in missed service level commitments. Once these problems happen it may not be easy for the storage administrator to identify and correct the problem in a timely manner, which can result in extended application outages or degradation. Identifying and correcting the source of these problems can be tedious and time consuming on systems with DASD configurations that can be tens of thousands of DASD volumes.

SUMMARY

An approach is disclosed that identifies an anomaly in a Volume Table of Contents Index (VTOC Index) that is associated with a Direct Access Storage Device (DASD) Volume Table of Contents (VTOC) that corresponds to a DASD. The approach operates to automatically correct the VTOC Index based on the identified anomaly.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein:

FIG. 2 provides an extension of the information handling system environment shown in FIG. 1 to illustrate that the methods described herein can be performed on a wide variety of information handling systems which operate in a networked environment;

DETAILED DESCRIPTION

Figure 1:
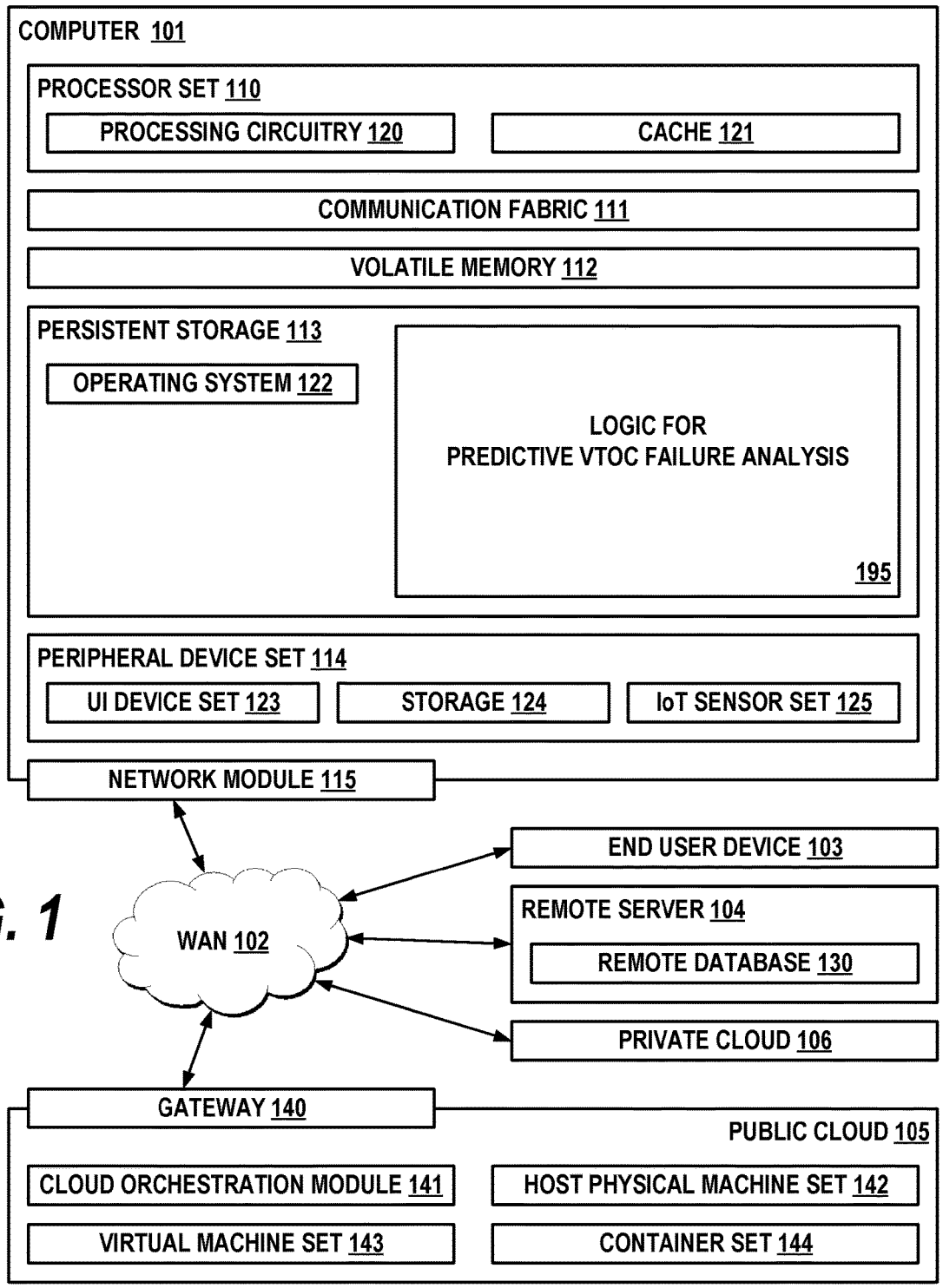
FIG. 1 is a block diagram of a data processing system in which the methods described herein can be implemented.

FIGS. 1-6 describe an approach for predictive Volume Table of Contents (VTOC) error analysis. This approach can identify potential problem areas listed below. Once these anomalies are identified, this approach can use cognitive logic to, automatically correct a disabled index VTOC, automatically correct the incorrect volume size in the VTOC. The approach also identifies volumes which are at risk for inadequate VTOC free space, index VTOC free space, and volume free space.

A storage administrator can spend several hours a day monitoring their environment for potential problems. With this approach storage administrators can, in mere minutes, proactively identify and resolve potential issues. This approach uses customer specified system parameters to control which actions are automated, reported or ignored. The default will be to make this information available to system automation products a customer may already have in place without taking any corrective actions.

This approach can perform the following tasks on all online volumes or a subset thereof to: (1) Identify any volumes with a disabled Index VTOC then ignore, reported or auto-correct based on customer specified parameters; (2) Identify volumes where the VTOC volume size with the actual volume are not in sync then ignore, report or auto-correct based on customer-controlled parameters; (3) Recognize volumes with undersized an Index VTOC and supply detailed information as to the correct size; (4) Recognize when a VTOC is running out of space based on customer specified thresholds; and (5) Recognize when a volume cannot support extending an Index VTOC The monitoring of these potential failures can be done run in several ways, including as a started task, as a batch job, from a TSO user session (on demand), and as part pf an Ansible playbook. In addition, since this approach is task based, it can be scheduled to run one or more times a day.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a block diagram of a data processing system in which the methods described herein can be implemented. Computing environment 100 contains an example of an environment for the execution of at least some of the computer code involved in performing the inventive methods, such as shown in the description of block 195. In addition to block 195, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 195, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 195 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface-type operating systems that employ a kernel. The code included in block 195 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

A NETWORKED ENVIRONMENT is shown in FIG. 2. The networked environment provides an extension of the information handling system shown in FIG. 1 illustrating that the methods described herein can be performed on a wide variety of information handling systems that operate in a networked environment, depicted by computer network 200. Types of computer networks can include local area networks (LANs), wide area networks (WANs), the Internet, peer-to-peer networks, public switched telephone networks (PSTNs), wireless networks, etc. Types of information handling systems range from small handheld devices, such as handheld computer/mobile telephone 205 to large mainframe systems, such as mainframe computer 240. Examples of handheld computer 205 include smart phones, personal digital assistants (PDAs), personal entertainment devices, such as MP3 players, portable televisions, and compact disc players. Other examples of information handling systems include pen, or tablet, computer 210, laptop, or notebook, computer 215, personal computer 220, workstation 230, and server computer system 235. Other types of information handling systems that are not individually shown in FIG. 2 can also be interconnected other computer systems via computer network 200.

Many of the information handling systems include nonvolatile data stores, such as hard drives and/or nonvolatile memory depicted in FIG. 1. These nonvolatile data stores and/or memory can be included, or integrated, with a particular computer system or can be an external storage device, such as an external hard drive. In addition, removable nonvolatile storage device 245 can be shared among two or more information handling systems using various techniques, such as connecting the removable nonvolatile storage device 245 to a USB port or other connector of the information handling systems.

An ARTIFICIAL INTELLIGENCE (AI) SYSTEM is depicted at the bottom of FIG. 2. Artificial intelligence (AI) system 250 is shown connected to computer network 200 so that it is accessible by other computer systems 205 through 240. AI system 250 runs on one or more information handling systems (comprising one or more processors and one or more memories, and potentially any other computing device elements generally known in the art including buses, storage devices, communication interfaces, and the like) that connects AI system 250 to computer network 200. The network 200 may include multiple computing devices 104 in communication with each other and with other devices or components via one or more wired and/or wireless data communication links, where each communication link may comprise one or more of wires, routers, switches, transmitters, receivers, or the like. AI system 250 and network 200 may enable functionality, such as question/answer (QA) generation functionality, for one or more content users. Other embodiments of AI system 250 may be used with components, systems, sub-systems, and/or devices other than those that are depicted herein.

AI system 250 maintains corpus 260, also known as a "knowledge base," which is a store of information or data that the AI system draws on to solve problems. This knowledge base includes underlying sets of facts, ground truths, assumptions, models, derived data, and rules which the AI system has available in order to solve problems. In one embodiment, a content creator creates content in corpus 260. This content may include any file, text, article, or source of data for use in AI system 250. Content users may access AI system 250 via a network connection or an Internet connection to the network 200, and, in one embodiment, may input questions to AI system 250 that may be answered by the content in the corpus of data. As further described below, when a process evaluates a given section of a document for semantic content, the process can use a variety of conventions to query it from the AI system.

AI system 250 may be configured to receive inputs from various sources. For example, AI system 250 may receive input from the network 200, a corpus of electronic documents or other data, a content creator, content users, and other possible sources of input. In one embodiment, some or all of the inputs to AI system 250 may be routed through the network 200. The various computing devices on the network 200 may include access points for content creators and content users. Some of the computing devices may include devices for a database storing the corpus of data. The network 200 may include local network connections and remote connections in various embodiments, such that AI system 250 may operate in environments of any size, including local and global, e.g., the Internet. Additionally, AI system 250 serves as a front-end system that can make available a variety of knowledge extracted from or represented in documents, network-accessible sources and/or structured data sources. In this manner, some processes populate the AI system with the AI system also including input interfaces to receive knowledge requests and respond accordingly.

AI Engine 270, such as a pipeline, is an interconnected and streamlined collection of operations. The information works its way into and through a machine learning system, from data collection to training models. During data collection, such as data ingestion, data is transported from multiple sources, such as sources found on the Internet, into a centralized database stored in corpus 260. The AI system can then access, analyze, and use the data stored in its corpus.

Models 275 are the result of AI modeling. AI modeling is the creation, training, and deployment of machine learning algorithms that emulate logical decision-making based on the data available in the corpus with the system sometimes utilizing additional data found outside the corpus. AI models 275 provide AI system 250 with the foundation to support advanced intelligence methodologies, such as real-time analytics, predictive analytics, and augmented analytics.

User interface 280, such as Natural Language (NL) Processing (NLP) is the interface provided between AI system 200 and human uses. Semantic content is content based on the relation between signifiers, such as words, phrases, signs, and symbols, and what they stand for, their denotation, or connotation. In other words, semantic content is content that interprets an expression, such as by using NLP. Semantic data is stored as part of corpus 260. In one embodiment, the process sends well-formed questions (e.g., natural language questions, etc.) to the AI system. AI system 250 may interpret the question and provide a response to the content user containing one or more answers to the question. In some embodiments, AI system 250 may provide a response to users in a ranked list of answers. Other types of user interfaces (UIs) can also be used with AI system 250, such as a command line interface, a menu-driven interface, a Graphical User Interface (GUI), a Touchscreen Graphical User Interface (Touchscreen GUI), and the like.

AI applications 290 are various types of AI-centric applications focused on one or more tasks, operations, or environments. Examples of different types of AI applications include search engines, recommendation systems, virtual assistants, language translators, facial recognition and image labeling systems, and question-answering (QA) systems.

In some illustrative embodiments, AI system 250 may be a question/answering (QA) system, which is augmented with the mechanisms of the illustrative embodiments described hereafter. A QA type of AI system 250 may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the I QA system. The statistical model may then be used to summarize a level of confidence that the QA system has regarding the evidence that the potential response, i.e. candidate answer, is inferred by the question. This process may be repeated for each of the candidate answers until the QA system identifies candidate answers that surface as being significantly stronger than others and thus, generates a final answer, or ranked set of answers, for the input question.

Figure 3:
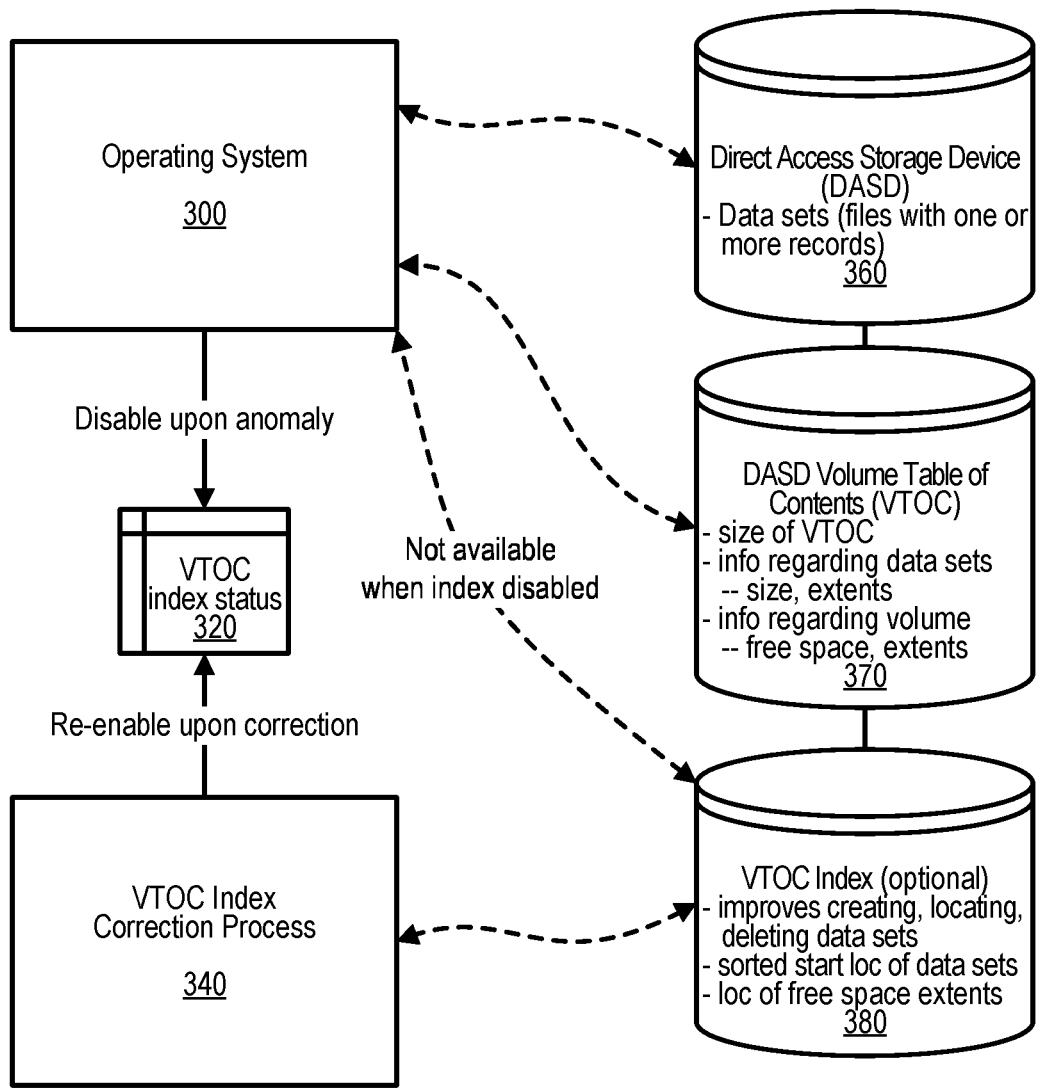
FIG. 3 is a component diagram depicting components used in a Volume Table of Contents (VTOC) index correction process.

FIG. 3 is a component diagram depicting components used in a Volume Table of Contents (VTOC) index correction process. Operating system 300, such as the z/OS™ operating system available from International Business Machines™ can encounter a variety of anomalies when interacting with Direct Access Storage Device (DASD) 360. In one embodiment, when certain anomalies are detected by operating system 300, VTOC index status is set to "disabled" so that the VTOC index is not used when accessing VTOC 370 and DASD 360. The VTOC index status is stored in memory area 320.

In the approach described herein, VTOC Index correction process 340 is performed to automatically detect and correct anomalies that have resulted in the VTOC Index being disabled or that might result in the VTOC Index to become disabled in the future. When VTOC Index correction process 340 corrects an anomaly and results in the VTOC Index being usable again, process 340 resets the VTOC Index status to "enabled" in memory area 320 so that the operating system can once again use the VTOC Index to improve performance. VTOC Index 380, while optional, is often highly recommended because of various performance improvements provided by use of the VTOC Index. These improvements include improves creating, locating, deleting data sets, providing a sorted start location of data sets, and the location of free space extents available on DASD.

DASD volumes are used for storing data and executable programs (including the operating system itself), and for temporary working storage. DASD labels identify DASD volumes and the data sets they contain. One DASD volume can be used for many different data sets, and space on it can be reallocated and reused. On a volume, the name of a data set must be unique. A data set can be located by device type, volume serial number, and data set name. This structure is unlike the file tree of a UNIX™ system. The basic z/OS™ file structure is not hierarchical. z/OS data sets have no equivalent to a path name.

Although DASD volumes differ in physical appearance, capacity, and speed, they are similar in data recording, data checking, data format, and programming. The recording surface of each volume is divided into many concentric tracks. The number of tracks and their capacity vary with the device. Each device has an access mechanism that contains read/write heads to transfer data as the recording surface rotates past them. Operating system 300 uses groups of labels to identify DASD volumes and the data sets they contain. DASD volumes use standard labels. Standard labels include a volume label, a data set label for each data set, and optional user labels. A volume label, stored at track 0 of cylinder 0, identifies each DASD volume. The z/OS system programmer or storage administrator uses the ICKDSF utility program to initialize each DASD volume before it is used on the system. ICKDSF generates the volume label and builds volume table of contents (VTOC) 370, a structure that contains the data set labels. The system programmer can also use ICKDSF to scan a volume to ensure that it is usable and to reformat all the tracks.

VTOC 370 includes a variety of information including the size of the VTOC, information regarding the data sets stored on DASD 360, such as size and extents information, and information regarding the volume, such as free space and volume information.

VTOC index 380 enhances the performance of VTOC access. The VTOC index is a physical-sequential data set on the same volume as the related VTOC. It consists of an index of data set names in DSCBs contained in the VTOC and volume free space information. The data set names are in format-1 and format-8 DSCBs. The free space information describes available tracks on the volume, available DSCBs in the VTOC and available records in the index.

In one embodiment, Device Support Facilities (ICKDSF) initializes a VTOC index into 2048-byte physical blocks, or 8192-byte physical blocks on an extended address volume, named VTOC index records (VIRs). The DEVTYPE INFO=DASD macro can be used to return the actual block size or it can be determined from examining the format-1 DSCB of the index data set. VIRs are used in several ways. A VTOC index contains the following kinds of VIRs:

- VTOC index entry record (VIER) identifies the location of format-1 and format-8 DSCBs and the format-4 DSCB.
- VTOC pack space map (VPSM) identifies the free and allocated space on a volume.
- VTOC index map (VIXM) identifies the VIRs that have been allocated in the VTOC index.
- VTOC map of DSCBs (VMDS) identifies the DSCBs that have been allocated in the VTOC.

Figure 4:
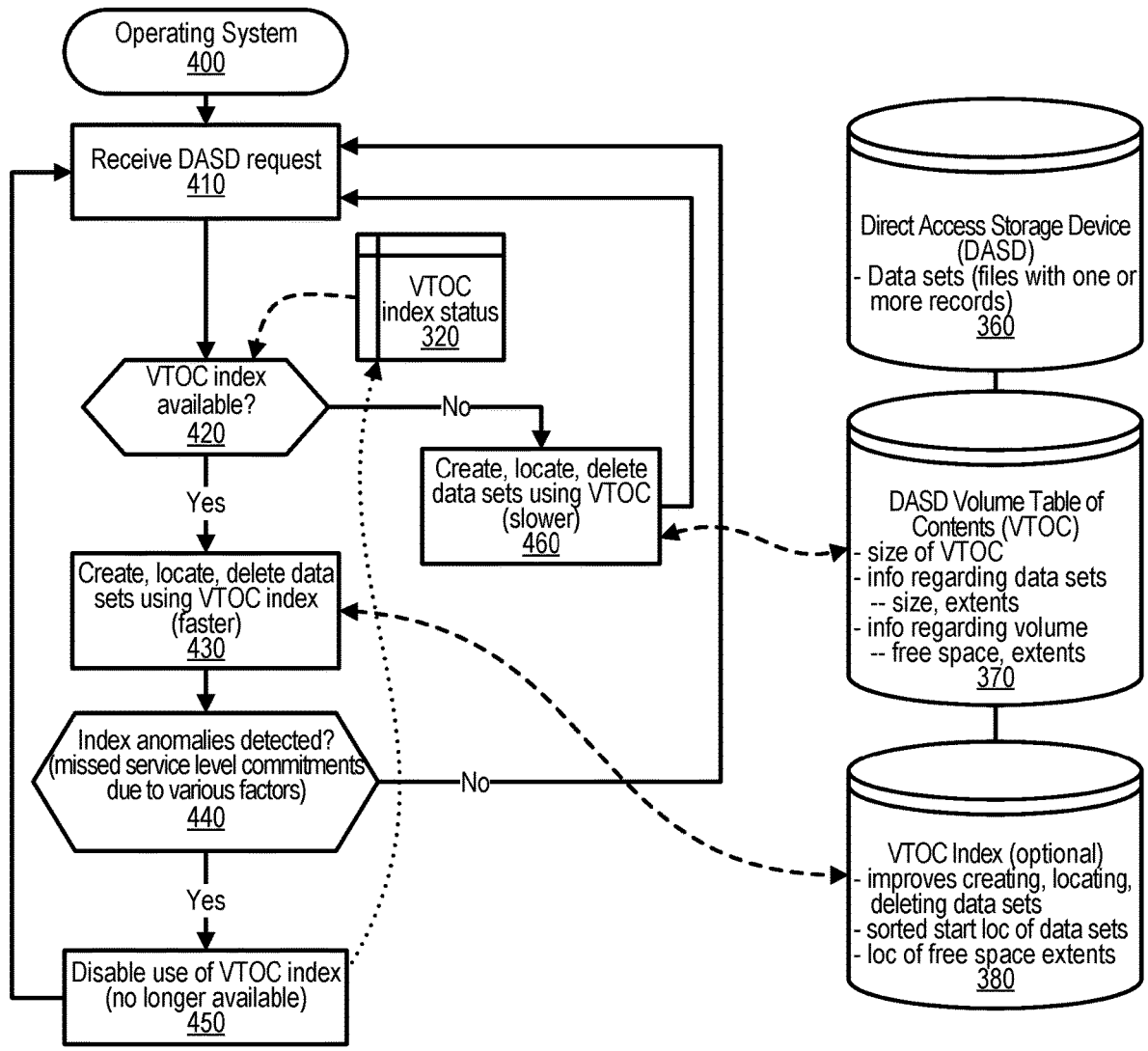
FIG. 4 is a flowchart depicting steps taken from the viewpoint of an operating system in utilizing a Volume Table of Contents (VTOC) index correction process.

FIG. 4 is a flowchart depicting steps taken from the viewpoint of an operating system in utilizing a Volume Table of Contents (VTOC) index correction process. FIG. 4 processing commences at 400 and shows the steps taken from the perspective of the operating system that utilizes DASD 360, VTOC 370, and VTOC Index 380.

At step 410, the operating system receives a DASD request, such as to add, modify, or delete a data set stored on the DASD. The operating system determines whether the VTOC index is available for use by checking the VTOC Index status from memory area 320 (decision 420). If the VTOC index available for use, then decision 420 branches to the 'yes' branch whereupon, at step 430, the process creates, locates, and deletes data sets using the VTOC index which is faster than performing these functions without the VTOC Index.

On the other hand, if the VTOC index has been disabled and is not available, then decision 420 branches to the 'no' branch whereupon, at step 460, the process creates locates, and deletes data sets using VTOC 370 and not using VTOC Index 380 which is a slower process than when the VTOC Index is used. Processing then loops back to receive the next DASD request at step 410.

The operating system continually determines whether VTOC index anomalies have been detected (decision 440). If VTOC index anomalies have been detected, then decision 440 branches to the 'yes' branch whereupon, at step 450, the process disables use of VTOC index in memory area 320 and the VTOC Index will no longer be available to the operating system. On the other hand, if index anomalies are not detected, then decision 440 branches to the 'no' branch and the VTOC Index status remains as 'enabled.' Processing then loops back to step 410 to receive the next DASD request.

Figure 5:
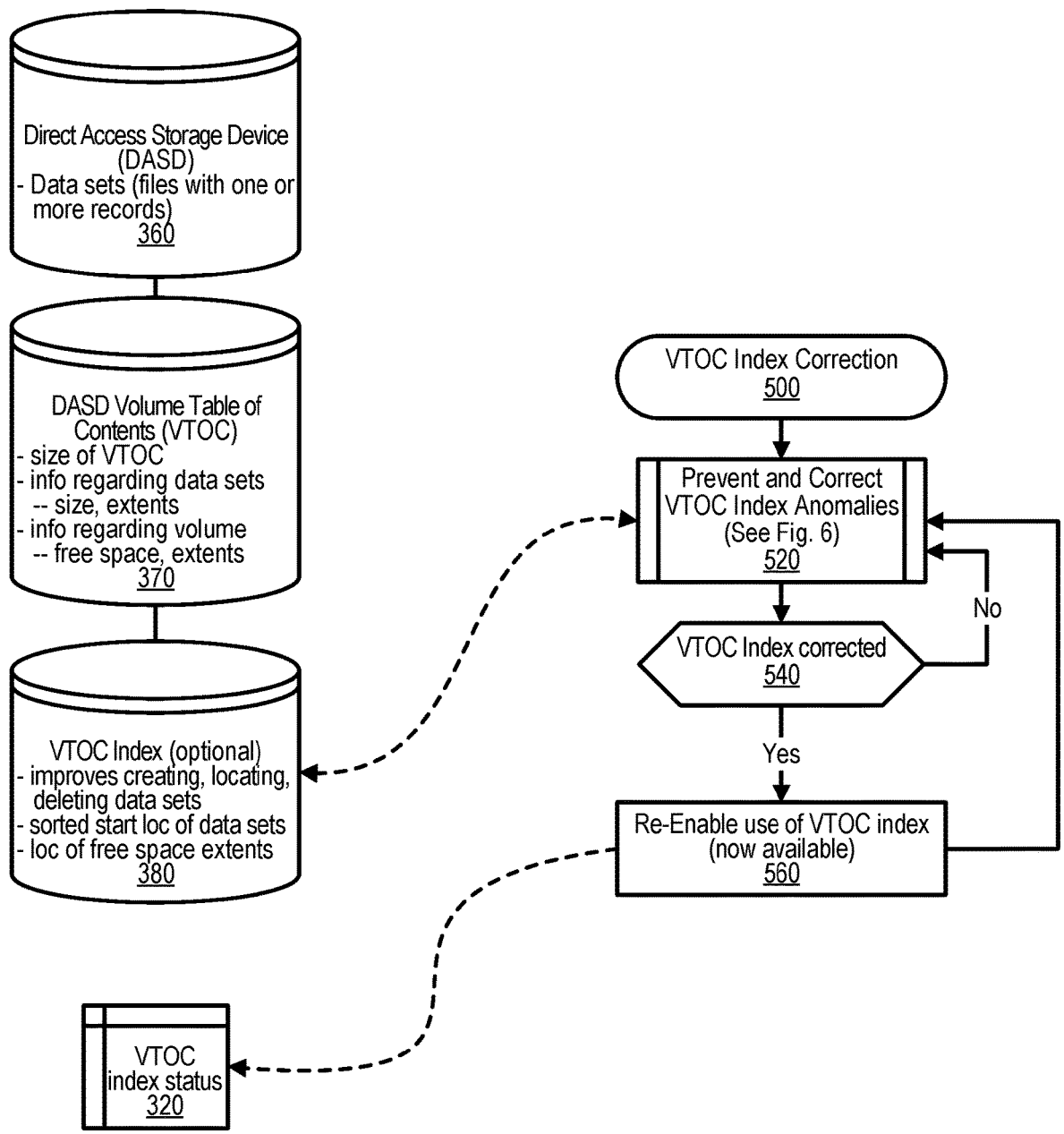
FIG. 5 is a flowchart depicting steps taken by the Volume Table of Contents (VTOC) index correction process.

FIG. 5 is a flowchart depicting steps taken by the Volume Table of Contents (VTOC) index correction process. FIG. 5 processing commences at 500 and shows the steps taken to perform an automatic VTOC Index Correction process. At predefined process 520, the process performs the Prevent and Correct VTOC Index Anomalies routine (see FIG. 6 and corresponding text for processing details).

The process determines whether the VTOC Index, if disabled, has been corrected and is now available for use (decision 540). If the VTOC Index has been corrected and is now available for use, then decision 540 branches to the 'yes' branch whereupon at step 560, the process re-enables use of the VTOC index (now available) by setting the VTOC Index status to 'enabled' in memory area 320. On the other hand, if the VTOC Index was not corrected (it may have already been enabled), then decision 540 branches to the 'no' branch bypassing step 560. Processing then loops back to predefined process 520 to continually monitor and correct VTOC Index anomalies.

Figure 6:
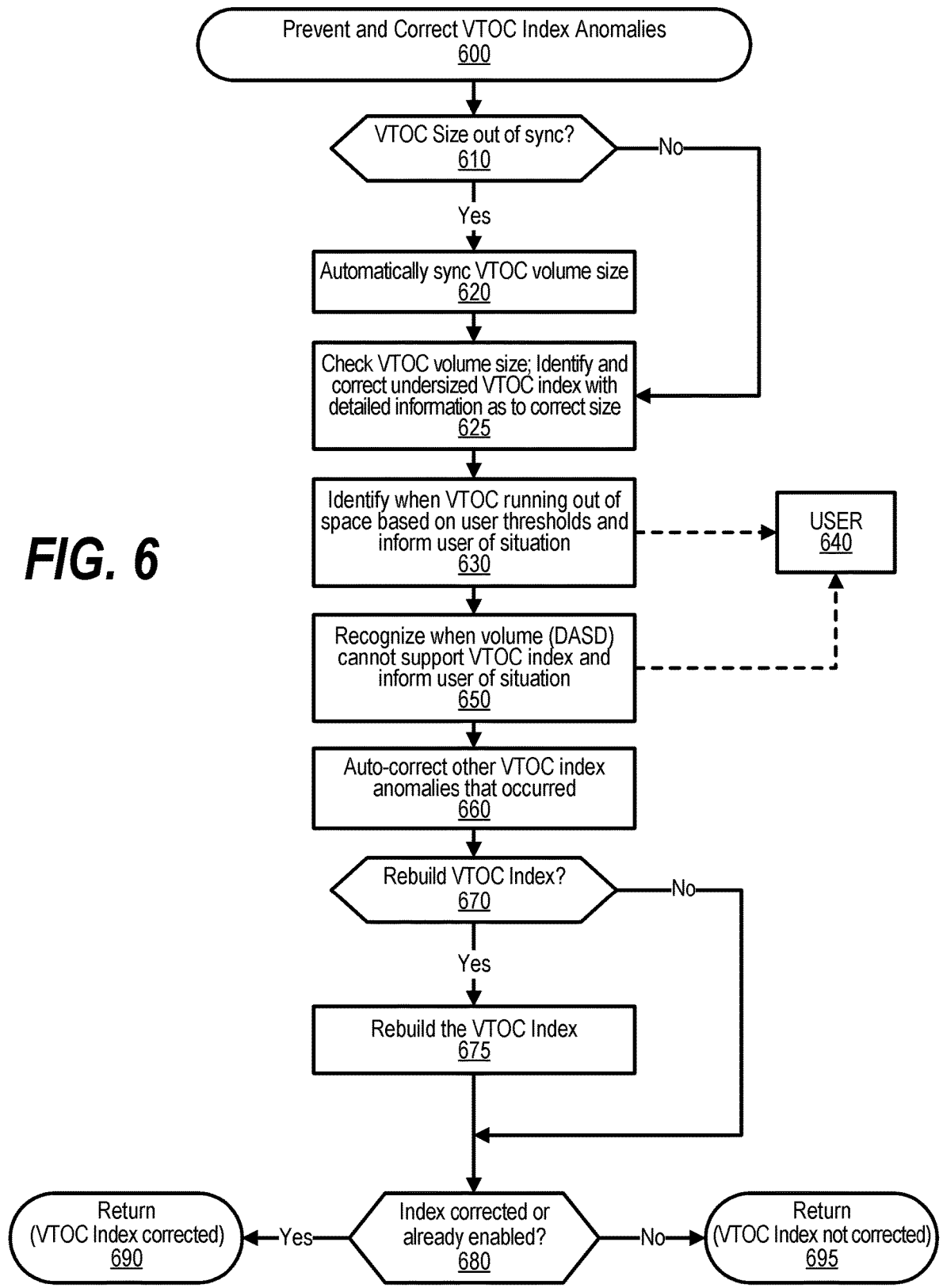
FIG. 6 is a flowchart depicting the steps taken by a process that prevents and corrects VTOX index anomalies.

FIG. 6 is a flowchart depicting the steps taken by a process that prevents and corrects VTOX index anomalies. FIG. 6 processing commences at 600 and shows the steps taken by a process that prevents and corrects VTOC Index anomalies. The process determines as to whether the VTOC Size out of sync (decision 610). If the VTOC Size out of sync, then decision 610 branches to the 'yes' branch whereupon, at step 620, the process automatically syncs the VTOC volume size. On the other hand, if not VTOC Size out of sync, then decision 610 branches to the 'no' branch bypassing step 620.

At step 625, the process checks the VTOC volume size; and automatically Identifies and corrects an undersized VTOC index with detailed information as to the correct size of the VTOC index. At step 630, the process identifies when the VTOC is running out of space based on user thresholds and informs user 640 of the situation. At step 650, the process recognizes when the volume (DASD) cannot support a VTOC index and informs user 640 of the situation.

At step 660, the process auto-corrects other VTOC index anomalies that might have occurred. There are many reasons why an index could become disabled. Normally, the operating system is trying to process the updating/adding/deleting of datasets and discovers a situation that is not normal. For example, when creating or extending a dataset, an orphaned Data Set Control Block (DSCB) is found in the VTOC. The index would be disabled because this indicates that the VTOC and the VTOC Index are out of sync. An anomaly would also occur if the VTOC index indicates that a free DSCB is available at a certain address, yet that DSCB, when read, is not actually a free DSCB. So, again, the VTOC and the VTOC Index do not match and the index is disabled. Rebuilding the VTOC index will resolve these and most other problems. However, in a traditional environment, rebuilding the VTOC Index is a manual process.

Many times, the root cause of how the VTOC and the VTOC Index get out of sync is not known. Sometimes it is a result of vendor code that does not properly serialize the VTOC resource. Sometimes is the result of the way system programmers set up the environment and share volumes that do not properly serialize resources. Sometimes, it is operating system code using internal macros without proper serialization that cause anomalies to occur. Again, rebuilding the VTOC Index resolves these and many other anomalies.

The process determines as to whether the VTOC Index needs to be rebuilt (decision 670). If the VTOC Index needs to be rebuilt, then decision 670 branches to the 'yes' branch whereupon, at step 675, a utility is automatically executed that rebuilds the VTOC Index. On the other hand, if the VTOC Index does not need to be rebuilt, then decision 670 branches to the 'no' branch bypassing step 675. The process determines whether the VTOC index was corrected or was already enabled (decision 680). If the VTOC index was corrected or was already enabled, then decision 680 branches to the 'yes' branch whereupon processing returns at 690 with a return code indicating that the VTOC Index is corrected so that the VTOC Index status can be set to 'enabled' by the calling routine (see FIG. 5). On the other hand, if the VTOC Index was not corrected, then decision 680 branches to the 'no' branch whereupon processing returns to the calling routine (see FIG. 5) at 695 with a return code indicating that the status of the VTOC Index has not changed.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
   receiving by a configurable predictive Volume Table of Contents (VTOC) failure analysis program, customer-specified system parameters to proactively identify and react to one or more anomalies in the VTOC and in a VTOC Index, wherein the one or more anomalies comprise volumes having a disabled VTOC Index, a VTOC volume size not in sync with an actual volume, the VTOC out of space based on a specified threshold, and unable to extend the VTOC Index; and
   based on the received customer-specified system parameters, automatically detecting and reacting to the one or more anomalies, wherein reacting includes customer-defined actions, wherein the customer-defined actions comprise automating, reporting, or ignoring.

2. The method of claim 1 further comprising:
   automatically rebuilding the VTOC Index.

3. The method of claim 2 further comprising:
   detecting that a VTOC and the VTOC Index are out of sync due to an orphaned dataset control block (DSCB), wherein the automatically rebuilding of the VTOC index is performed in response to the detecting.

4. The method of claim 1 further comprising:
   identifying a dataset control block (DSCB) at an address as being a free DSCB; and
   reading the identified DSCB, the reading determining that the identified DSCB is not actually free, wherein the determined results is the anomaly.

5. An information handling system comprising:
   one or more processors;
   a memory coupled to at least one of the processors; and
   a set of instructions stored in the memory and executed by at least one of the processors to perform actions comprising:
   receiving by a configurable predictive Volume Table of Contents (VTOC) failure analysis program, customer-specified system parameters to proactively identify and react to one or more anomalies in the VTOC and in a VTOC Index, wherein the one or more anomalies comprise volumes having a disabled VTOC Index, a VTOC volume size not in sync with an actual volume, the VTOC out of space based on a specified threshold, and unable to extend the VTOC Index; and
   based on the received customer-specified system parameters, automatically detecting and reacting to the one or more anomalies, wherein reacting includes customer-defined actions, wherein the customer-defined actions comprise automating, reporting, or ignoring.

6. The information handling system of claim 5 wherein the actions further comprise:
   automatically rebuilding the VTOC Index.

7. The information handling system of claim 6 wherein the actions further comprise:
   detecting that a VTOC and the VTOC Index are out of sync due to an orphaned dataset control block (DSCB), wherein the automatically rebuilding of the VTOC index is performed in response to the detecting.

8. The information handling system of claim 5 wherein the actions further comprise:
   identifying a dataset control block (DSCB) at an address as being a free DSCB; and
   reading the identified DSCB, the reading determining that the identified DSCB is not actually free, wherein the determined results is the anomaly.

9. A computer program product comprising:
   a computer readable storage medium comprising a set of computer instructions, the computer instructions performing actions comprising:
   receiving by a configurable predictive Volume Table of Contents (VTOC) failure analysis program, customer-specified system parameters to proactively identify and react to one or more anomalies in the VTOC and in a VTOC Index, wherein the one or more anomalies comprise volumes having a disabled VTOC Index, a VTOC volume size not in sync with an actual volume, the VTOC out of space based on a specified threshold, and unable to extend the VTOC Index; and
   based on the received customer-specified system parameters, automatically detecting and reacting to the one or more anomalies, wherein reacting includes customer-defined actions, wherein the customer-defined actions comprise automating, reporting, or ignoring.

10. The computer program product of claim 9 wherein the actions further comprise:
    automatically rebuilding the VTOC Index.

11. The computer program product of claim 10 wherein the actions further comprise:
    detecting that a VTOC and the VTOC Index are out of sync due to an orphaned dataset control block (DSCB), wherein the automatically rebuilding of the VTOC index is performed in response to the detecting.

12. The computer program product of claim 9 wherein the actions further comprise:
    identifying a dataset control block (DSCB) at an address as being a free DSCB; and reading the identified DSCB, the reading determining that the identified DSCB is not actually free, wherein the results is the anomaly.

* * * * *